United States Patent [19]

Bainard

[11] Patent Number: 4,542,573

[45] Date of Patent: Sep. 24, 1985

[54] METHOD OF PRODUCING A HYDRODYNAMIC SEAL

[75] Inventor: Dean R. Bainard, Lake Wylie, S.C.

[73] Assignee: The Fluorocarbon Company, Laguna Niguel, Calif.

[21] Appl. No.: 656,082

[22] Filed: Sep. 28, 1984

[51] Int. Cl.<sup>4</sup> ...................... B23P 17/00; E21B 33/00; B61F 15/22

[52] U.S. Cl. .......................................... 29/417; 277/1; 277/134

[58] Field of Search .................... 277/134, 1, 152, 153; 29/417

[56] References Cited

U.S. PATENT DOCUMENTS

| 3,857,156 | 12/1974 | Clark | 29/417 |
|---|---|---|---|
| 3,929,341 | 12/1975 | Clark | 29/417 |
| 3,939,551 | 2/1976 | Clark et al. | 29/417 |
| 3,984,113 | 10/1976 | Bentley | 277/134 |
| 4,131,285 | 12/1978 | Denton et al. | 277/1 |
| 4,450,614 | 5/1984 | Repella | 29/417 |
| 4,451,050 | 5/1984 | Repella | 277/1 |
| 4,497,496 | 2/1985 | Repella | 29/417 |

Primary Examiner—Mark Rosenbaum
Assistant Examiner—Steven Nichols
Attorney, Agent, or Firm—Knobbe, Martens, Olson & Bear

[57] ABSTRACT

A method of producing a hydrodynamic sealing element is disclosed wherein washer-like sealing elements may be partially sliced from a cylindrical billet and formed to have an axially extending inner portion adapted to sealingly engage a rotating shaft. The inside surface of the axially extending portion is grooved to facilitate the sealing action. Grooving is accomplished by axial withdrawal action of the same cutting element that partially slices and forms the sealing element.

13 Claims, 8 Drawing Figures

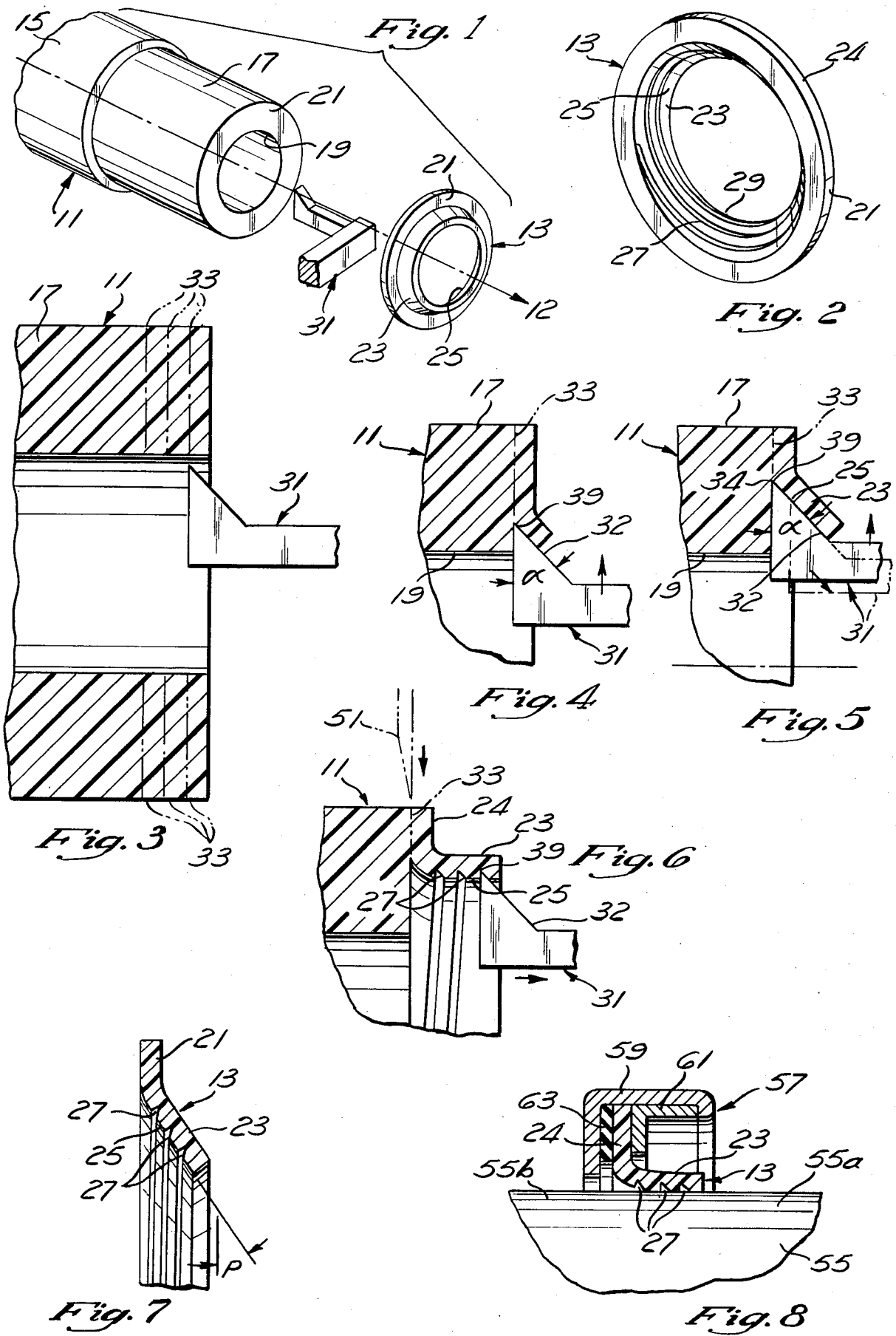

METHOD OF PRODUCING A HYDRODYNAMIC SEAL

BACKGROUND OF THE INVENTION

This invention relates to the manufacture of hydrodynamic seals. More particularly, the invention relates to an improved process for the formation of hydrodynamic seals from polytetrafluoroethylene (PTFE) and the like.

Hydrodynamic seals are widely used as sealing elements for preventing the passage of fluid along a rotating shaft. Hydrodynamic seals are generally annular in shape, having a frusto-conical or truncated central portion adapted to bear against the rotating shaft. The truncated portion includes a spiral groove along its inner surface that functions to facilitate the return of any fluid, e.g. oil, which may be present on the shaft to the oil side of the seal.

Because of its ability to withstand high temperature operation, PTFE is generally acknowledged as a highly desirable material for use in the formation of hydrodynamic seals. However, due to difficulty of molding materials such as PTFE, into the desired shape for sealing elements, alternative methods of manufacture are employed. The methods heretofore proposed require expensive and cumbersome machinery to form the truncated portion and/or the inner spiral grooves. Those requirements result in increasing the cost of the manufacture of such seals.

In accordance with one contemporary technique for the manufacture of PTFE hydrodynamic seals, a spiral groove is machined on the face of the PTFE billet prior to slicing an annular section from the rotating billet. After slicing, the resulting section is then deformed under pressure to form a truncated central portion having the spiral groove on the inner surface of the truncated portion. Exemplary of this method of fabrication is the technique set forth in U.S. Pat. No. 3,857,156 to Clark. Though such a method produces an adequate sealing element, it has the disadvantage of requiring a press-forming operation to form the truncated inside surface of the seal. Such an operation not only necessitates additional manufacturing time and purchase of expensive deforming machinery, but also introduces the possibility that the sealing element may be deformed unevenly and thus result in a defective seal.

In accordance with a second contemporary manufacturing technique, an annular section is again deformed under pressure to form a truncated portion. The spiral groove is then formed on the sealing element by continuing to press the truncated portion against a threaded surface. This press forming, or coining process also requires expensive additional machinery, such as die tooling apparatus, which also increases the potential that the sealing element may be formed defectively. Exemplary of such techniques are those disclosed in U.S. Pat. Nos. 3,929,341; 3,939,551; and 3,985,487, issued to Clark, et al.

SUMMARY OF THE INVENTION

In accordance with the present invention there is provided an improved method of producing a hydrodynamic sealing element which produces a reliable product without the need for expensive deforming or coining machinery. In accordance with the present invention, a sealing element is formed from a rotating tubular billet of material such as PTFE by being partially sliced by a cutting tool advancing radially, perpendicular to the billet axis of rotation. For example, the cutting tool may be applied to the inside surface of the rotating billet and advanced radially towards the billet outside surfaces. As the cutting tool proceeds along a radial cutting line, the sliced material abuts against a surface of the cutting tool and is urged to deform axially outwardly at an angle defined by the intersection of the cutting tool and the cutting line.

After the cutting tool has traversed a variable, controlled distance between the billet inside and outside diameters, it is retracted from the radial cutting line and grooves are formed on the inside surface of the deformed portion. Those grooves may be formed simultaneously with the retraction of the cutting tool by retracting the tool in a direction generally parallel to the billet axis of rotation such that the tip of the cutting tool moves along the inside surface of the sliced portion. Because the billet continues to rotate, the action of the tip of the cutting tool against the sliced portion of the billet results in the formation of a spiral groove along the inside surface of the sliced portion.

Upon formation of the spiral grooves, the remainder of the section is separated from the billet by advancing a cutting tool radially along the cutting line until the cutting tool completes the separation of the section from the billet. The sealing elements produced by this method have the same functional hydrodynamic characteristics as those produced by prior art methods. However, by requiring fewer forming operations the sealing elements formed by the present invention are subject to the introduction of fewer defects into the final product.

BRIEF DESCRIPTION OF THE DRAWINGS

FIG. 1 is an exploded perspective drawing showing a tubular billet and a cutting tool as may be used in the present manufacturing process, and a sealing element formed from such a billet in accordance with the present invention.

FIG. 2 is an enlarged perspective view of the sealing element of FIG. 1 showing the opposite side.

FIG. 3 is a cross-sectional view of a portion of the billet of FIG. 1 to be used in the formation of a series of sealing elements with a cutting tool adjacent thereto.

FIGS. 4 and 5 are cross-sectional, schematic views illustrating the steps of partially slicing and deforming a section of the billet.

FIG. 6 is a cross-sectional, schematic view illustrating the formation of a spiral groove along a surface of the partially sliced section and an exemplary manner of completing the separation of the sealing element from the billet.

FIG. 7 is a cross-sectional view of a section of the sealing element upon completion of the grooving operation.

FIG. 8 is a plan view of an application utilizing the sealing element formed in accordance with the present invention.

DETAILED DESCRIPTION OF THE INVENTION

With reference to FIG. 1 of the drawings, a tubular billet 11 is formed as a cylindrical member having a cylindrical bore therein. In accordance with the present invention the billet 11 is formed into a series of sealing elements 13 utilizing a cutting tool 31. Depending upon the particular application, the outside surface 15 of billet 11 may be machined to conform to the desired specifications. The billet 11 is rotated about its axis 12 while machined outside surface 15 to produce machined outside surface 17, having a desired, precise outside diameter. Inside surface 19 may also be machined to conform the inside diameter to the desired specifications for a particular application, i.e., to conform to the outside diameter of a shaft to be sealed upon completion of the manufacturing process. The billet front face 21 may also be machined to produce a smooth front surface.

Referring to FIG. 2, as well as FIG. 1, the sealing element 13 is formed to have a truncated inner portion 23 extending axially forward from an outer annular portion 24. The rear or inner face 25 of portion 23 is provided with a spiral groove 27 extending from the inner diameter 29 of the portion 23 to the annular portion 24. The precise size and shape of groove 27 is determined in accordance with the size and operating characteristics of the surface against which sealing element 13 is to provide sealing action.

FIG. 3 illustrates the cutting tool 31 being brought adjacent the inside surface of billet 11. Cutting lines 33 illustrate cutting planes for progressive slicing of annular or washer-like sections of billet 11 which are formed into the sealing elements 13.

As shown in FIGS. 4 and 5, the cutting edge 39 of tool 31 is advanced radially along the first cutting line 33 in the direction of the vertical arrows to point 34 on a circle which lies between the billet inside surface 19 and outside surface 17. As the tool 31 is advanced radially outwardly, a portion 23 of the billet 11 is separated from the remaining portion of billet 11 and deformed, by contact with a surface 32 of the tool 31. The deformed portion 23 progressively abuts against the tool surface 32 and is deformed axially forwardly from the billet at an angle generally conforming to the angle a formed between the tool surface 32 and the cutting line 33. The seal element portion 23 is also deformed radially outwardly such that its inner diameter is enlarged. Thus, the action of the cutting tool 31 has the simultaneous effect of separating and deforming section 23 from the remaining portion of billet 11. The resiliency of the billet material acts to press the deformed portion 23 against the tool surface 32 as the tool is advanced along the cutting line 33. That resiliency will, of course, vary in accordance with the structural characteristics of the material used to form billet 11, the thickness of the deformed portion, and the angle of tool 31 with respect to cutting line 33.

FIG. 6 illustrates the formation of the spiral groove 27 on the inside surface 25 of portion 23. After the simultaneous cutting and deforming operation described in connection with FIGS. 4 and 5 has been accomplished, cutting edge 39 of tool 31 is withdrawn from cutting line 33. The retraction of tool 31 from cutting line 33 is accomplished by moving tool 31 from billet 11 in a direction generally parallel to the rotational axis 12 of billet 11. This general direction is illustrated by the horizontal arrow shown on FIG. 6. As shown in FIG. 5, initial retraction of the cutting edge 39 from cutting line 33 may, however, be accomplished by drawing the tool 31 a short distance from its initial position in a radial direction or angled direction with respect to rotational axis 12 (illustrated by the phantom lines and downward sloping arrow in FIG. 5) before moving the tool in the direction of the horizontal arrow (FIG. 6). Such an initial movement will reduce the initial resistance against the movement of tool 31 from cutting line 33.

It will be recognized by those skilled in the art that the precise movement of tool 31 may be selected in view of the load that is to be applied to the cutting edge 39 as it bears against surface 25. The greatest resistance to the movement of tool 31 in the direction indicated by the arrow shown in FIG. 6 will occur when cutting edge 39 is first lifted from cutting line 33. Resistance to further movement of tool 31 in the direction of the arrow will decrease as cutting edge 39 becomes further spaced from cutting line 33. Thus, various techniques may be implemented to reduce the initial resistance against the movement of tool 31 while permitting tool 31 to form the groove 27 along surface 25.

Groove 27 may be formed along the entire length of surface 25, or some portion thereof. If only a portion of surface 25 is to be grooved, cutting edge 31 may be disengaged from cutting engagement with surface 37 before tool 31 is retracted to the end of section 23. The depth of the grooves will be affected by the resiliency and thickness of the deformed portion 23 which bears against the cutting tool 31. The depth of the grooves may also be controlled by varying the direction at which cutting tool is retracted along the inner surface 25.

FIG. 6 also illustrates an exemplary manner of completing the separation of sealing element 13 from billet 11. Flat, annular section 24 may be separated from billet 11 by cutting tool 51 which advances radially inwardly along line 33 in the direction of the vertical arrow shown in FIG. 6, until it reaches circle 34, at which time the sealing element is fully separated.

It should also be recognized that a cutting tool may, in the alternative, contact billet 11 at circle 34 and advance radially outwardly in a direction opposite that of the arrow shown in FIG. 6 until the sealing element is fully separated.

FIG. 7 illustrates the resiliency of the deformed portion 23 after the cutting tool is disengaged. As shown, the deformed portion assumes an orientation at an angle b, with respect to the radial cutting line upon disengagement of the cutting tool 31. As can be seen by comparison with FIG. 5, the angle b is less then the angle a, as defined by the orientation of the cutting tool with respect to the cutting line 33. Thus, the resiliency of the deformed portion 23 causes that portion to move back to more of a vertical position after the abutting surface of tool 31 is removed from contact. This same resiliency is useful in holding portion 23 in sealing contact with a rotating shaft, when the sealing element is in use.

FIG. 8 illustrates the use of a sealing element, formed in accordance with the present invention. Sealing element 13 is disposed about shaft 55 in order to oppose the passage of fluids along the surface of the shaft. Typically, one portion of the shaft, e.g. 55a is in a region where a lubricant such as oil is present. However, passage of such a fluid to another portion of the shaft, e.g. 55b is undesirable. Sealing element 13 serves to prevent such passage.

Sealing element 13 is mounted within frame 57 which is disposed about the shaft 55. Frame 57 includes an outer case 59, an inner case 61 and a gasket 63. Both outer case 59 and inner case 61 have cylindrical portions disposed about the shaft and radial flanges disposed about flat portion 24 of the sealing element 13. Gasket 63 serves to insure sealing engagement between the sealing element 13 and the outer case 59. The groove 27 is designed with the rotational direction of shaft 55 in mind, such that fluid on the surface of the shaft is discharged into the threaded regions and directed towards the fluid side of the shaft. Various shapes of grooves may be employed to produce the desired hydrodynamic action.

To those skilled in the art to which the invention relates, many additional changes in construction, differing embodiments and applications of the invention will suggest themselves without departing from the spirit and scope of the invention. For example, the invention may be implemented to form a sealing element having a deformed outer portion and a flat inner portion. The sealing element so formed may be adapted to provide a seal to prevent the passage of fluids along a surrounding cylindrical sidewall. The process to form such a sealing element is essentially identical to that previously described and illustrated with the exception that tool 31 is brought into initial contact with the outside surface 17 of billet 11, rather than the inside portion as illustrated at FIG. 4. The outside surface of the deformed section may be grooved by moving tool 31 in the same manner as described in connection with FIGS. 5 and 6. Additionally, the spiral groove may be formed by a cutting tool other than cutting tool 31.

What is claimed is:

1. A method of producing a hydrodynamic seal from a tubular billet, having inside and outside cylindrical surfaces, said method comprising:
    slicing a first portion of an annular section of the billet by applying a cutting tool to one of said surfaces while the billet is rotating about the axis of said surfaces, and advancing the cutting tool radially a portion of the distance between the billet inside and outside surfaces along a cutting line;
    deforming the sliced portion by extending it the axially away from the cutting line, said deformed portion having an outer surface and an inner surface;
    cutting a groove in the inner surface of the deformed portion; and
    completing the slicing of said section from the billet.

2. The method as recited in claim 1, wherein the step of deforming is performed simultaneously with the step of slicing said first portion of said section.

3. The method as recited in claim 2, wherein the steps of slicing and deforming are accomplished by the same cutting tool.

4. The method as recited in claim 3, wherein the step of deforming is performed by progressively abutting the sliced portion against a surface of the cutting tool such that the sliced portion deforms axially from the billet at an angle generally conforming to an angle formed between the cutting tool surface and the cutting line.

5. The method as recited in claim 4, wherein the step of cutting a groove is performed by retracting the cutting tool from the cutting line along the inner surface of the deformed portion.

6. The method as recited in claim 5, further including the step of withdrawing the cutting tool from further contact with the deformed portion.

7. The method as recited in claim 1, wherein the step of cutting a groove is performed by retracting the cutting tool from the cutting line along the inner surface of the deformed portion.

8. The method as recited in claim 7 or 5, wherein the step of retracting the cutting tool from the cutting line includes the step of retracting the cutting tool in a direction generally parallel to the rotational axis of the billet.

9. The method as recited in claim 1, wherein the step of slicing a portion of a said section includes the step of applying the cutting tool to the inside surface of the rotating billet and advancing the tool radially outwardly a portion of the distance to the outside surface.

10. The method as recited in claim 9, wherein the step of completing the slicing of the annular section of the billet includes the step of applying a cutting tool to the outside surface of the billet and advancing the cutting tool radially inward along the cutting line.

11. A method of manufacturing a hydrodynamic seal from a tubular billet having inside and outside cylindrical surfaces comprising:
    slicing a portion of a washer-like section of the billet by applying a first cutting tool to the inside surface of a rotating billet and advancing the first cutting tool radially outward a portion of the distance to the outside surface along a cutting line;
    simultaneously deforming at least a portion of the sliced portion such that the deformed portion extends axially away from the cutting line, said deformation being accomplished by progressively abutting a first surface of the sliced portion against the first cutting tool such that the sliced portion is urged to generally conform to the angle formed between the first cutting tool and the cutting line;
    retracting the cutting tool from the cutting line along the first surface of the partially sliced section;
    cutting a helical groove in the first surface of the sliced portion abutting against the cutting tool as the cutting tool is retracted from the cutting line; and
    completing the slicing of the annular section of the billet by applying a second cutting tool to the outside surface of the billet and advancing said second cutting tool radially inward along the cutting line.

12. A method of producing a seal from a tubular billet having an end face, and radially inside and outside surfaces, said method comprising:
    slicing a portion of washer-like section from the billet by applying a cutting tool to one of said surfaces of the billet at a point axially spaced a short distance from said end face, and rotating the billet while advancing the cutting tool radially only part of the distance between the billet inside and outside surfaces along a cutting line such that said billet end face forms one end face of said sections and the opposite end face of said section portion is formed by said slicing step;
    cutting a groove in said opposite end face of said portion; and
    completing the slicing of the washer-like section of the billet after the cutting step.

13. The method as recited in claim 1 wherein said billet is made of a material, such as polytetrafluoroethylene, and including the step of deforming said portion axially with the steps of slicing said portion and cutting said groove.

* * * * *